(12) United States Patent
Chiba et al.

(10) Patent No.: US 6,915,406 B2
(45) Date of Patent: Jul. 5, 2005

(54) ADDRESS TRANSLATION APPARATUS, ADDRESS TRANSLATION METHOD, AND TWO-LAYER ADDRESS TRANSLATION APPARATUS

(75) Inventors: Takuma Chiba, Kawasaki (JP); Tsuyoshi Motokurumada, Kawasaki (JP); Iwao Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 10/330,322

(22) Filed: Dec. 30, 2002

(65) Prior Publication Data

US 2004/0006679 A1 Jan. 8, 2004

(30) Foreign Application Priority Data

Jul. 5, 2002 (JP) .................................... 2002-197952

(51) Int. Cl.[7] .............................................. G06F 12/00
(52) U.S. Cl. .................................... 711/207; 711/158
(58) Field of Search ............................ 711/129, 150, 711/151, 158, 207

(56) References Cited

U.S. PATENT DOCUMENTS

| | | | |
|---|---|---|---|
| 5,835,962 A | * | 11/1998 | Chang et al. ............... 711/206 |
| 6,092,172 A | | 7/2000 | Nishimoto et al. |
| 6,119,205 A | * | 9/2000 | Wicki et al. ................. 711/143 |
| 6,202,154 B1 | * | 3/2001 | Suzuki et al. ............... 713/200 |
| 6,298,404 B1 | | 10/2001 | Mishra |
| 6,389,527 B1 | * | 5/2002 | Raam et al. .................. 712/38 |
| 6,560,664 B1 | * | 5/2003 | Carlson ....................... 710/113 |
| 6,622,218 B2 | * | 9/2003 | Gharachorloo et al. ..... 711/141 |
| 6,728,800 B1 | * | 4/2004 | Lee et al. ..................... 710/54 |
| 2002/0065867 A1 | * | 5/2002 | Chauvel ..................... 709/104 |

FOREIGN PATENT DOCUMENTS

| | | |
|---|---|---|
| JP | HEI5-151086 A | 6/1993 |
| JP | HEI10-177520 A | 6/1998 |
| JP | 2000-184157 A | 6/2000 |

* cited by examiner

*Primary Examiner*—Matthew Kim
*Assistant Examiner*—Woo H. Choi
(74) *Attorney, Agent, or Firm*—Staas & Halsey LLP

(57) ABSTRACT

A first table stores operand data for translation of operand virtual address into a physical address. A second table stores instruction data for translation of instruction virtual address into a physical address. The first and the second tables are formed in one memory. If operand access and instruction access are generated simultaneously, the operand access is executed with priority and the instruction virtual address is held in a wait register after that the instruction access is executed after finishing the operand access based on a wait instruction virtual address.

14 Claims, 9 Drawing Sheets

| INPUT SIGNAL | | | | OUTPUT SIGNAL | | | | |
| --- | --- | --- | --- | --- | --- | --- | --- | --- |
| OP_GO | IF_GO | IF_TOQ | WIF_VLD | OP_SEL | IF_SEL | WIF_SEL | WReg_E | WReg_VLD_in |
| 1 | 0 | 0 | 0 | 1 | 0 | 0 | 0 | 0 |
| 1 | 0 | 0 | 1 | 1 | 0 | 0 | 0 | 0 |
| 1 | 0 | 1 | 0 | 1 | 0 | 0 | 0 | 0 |
| 1 | 0 | 1 | 1 | 1 | 0 | 0 | 0 | 0 |
| 1 | 1 | 0 | 0 | 1 | 0 | 0 | 1 | 1 |
| 1 | 1 | 0 | 1 | 1 | 0 | 0 | 0 | 0 |
| 1 | 1 | 1 | 0 | 1 | 0 | 0 | 1 | 1 |
| 1 | 1 | 1 | 1 | 1 | 0 | 0 | 1 | 1 |
| 0 | 0 | 0 | 0 | 0 | 0 | 0 | 0 | 0 |
| 0 | 0 | 0 | 1 | 0 | 0 | 1 | 1 | 0 |
| 0 | 0 | 1 | 0 | 0 | 0 | 0 | 0 | 0 |
| 0 | 0 | 1 | 1 | 0 | 0 | 1 | 1 | 0 |
| 0 | 1 | 0 | 0 | 0 | 1 | 0 | 1 | 1 |
| 0 | 1 | 0 | 1 | 0 | 0 | 1 | 0 | 0 |
| 0 | 1 | 1 | 0 | 0 | 1 | 0 | 1 | 1 |
| 0 | 1 | 1 | 1 | 0 | 1 | 0 | 0 | 0 |

FIG.3

| 111b | | | | | | | |
|---|---|---|---|---|---|---|---|
| INPUT SIGNAL | | | OUTPUT SIGNAL | | | | |
| OP_GO | IF_GO | WIF_VLD | OP_SEL | IF_SEL | WIF_SEL | WReg_E | WReg_VLD_in |
| 1 | 0 | 0 | 1 | 0 | 0 | 0 | 0 |
| 1 | 0 | 1 | 1 | 0 | 0 | 0 | 0 |
| 1 | 1 | 0 | 1 | 0 | 0 | 1 | 1 |
| 1 | 1 | 1 | 1 | 0 | 0 | 0 | 0 |
| 0 | 0 | 0 | 0 | 0 | 0 | 0 | 0 |
| 0 | 0 | 1 | 0 | 0 | 1 | 1 | 0 |
| 0 | 1 | 0 | 0 | 1 | 0 | 0 | 0 |
| 0 | 1 | 1 | 0 | 0 | 1 | 1 | 1 |

| PAGE_TABLE_ENTRY | TLB-TAG<41:0> | TLB-DATA<29:0> |

| VA<63:0> | PA<42:0> |
|---|---|
| aaaa 0000 0000 0000 | 000 00ff 0000 |
| aaaa 0000 0000 2000 | 000 00ff 2000 |
| aaaa 0000 0100 0000 | 000 ff00 0000 |
| aaaa 0000 0100 2000 | 000 ff00 2000 |

CPU (10) ⇔ MAIN MEMORY (20)

| RAM-ACCS-ADRS<8:0> | TLB-TAG<41:0> | TLB-DATA<29:0> |
|---|---|---|
| 000 | 2aaa 8000 0000 | 0000 07f8 |
| 001 | 2aaa 8000 0000 | 0000 07f9 |

ADDRESS TRANSLATION APPARATUS, ADDRESS TRANSLATION METHOD, AND TWO-LAYER ADDRESS TRANSLATION APPARATUS

BACKGROUND OF THE INVENTION

1) Field of the Invention

The present invention relates to an address translation apparatus, an address translation method, and a two-layer address translation apparatus that carry out an address translation from a virtual address into a physical address in a computer system of a virtual storage system at a high speed.

2) Description of the Related Art

Conventionally, in a computer of a virtual storage system, there is prepared a list called a page table for carrying out address translation from a virtual address (VA) to a physical address (PA).

The address translation will be explained below with reference to FIG. 10. FIG. 10 shows a computer system of a virtual storage system. In this computer system, a CPU (central processing unit) 10 executes various operation instructions by making an access to a main memory 20.

The main memory 20 stores a page table 30 for translation of the virtual address VA into the physical address PA. The virtual address VA is an address specified in a computer program, while the physical address PA is an address allocated to a physical memory unit in the main memory 20.

The page table 30 is a table which matches a virtual address VA and a physical address PA. The virtual address VA and the physical address PA are expressed in hexadecimal numbers like "aaaa 0000 0000 0000".

The virtual address VA has a 64-bit structure <63:0> (bit 0 to bit 63), as shown in FIG. 11A. In the virtual address VA <63:0>, VA <12:0> is an offset value having a 13-bit structure (hereinafter to be described as Off-SET <12:0>).

VA <21:13> is a RAM access address having a 9-bit structure (hereinafter to be described as RAM-ACCS-ADRS <8:0>). This RAM-ACCS-ADRS <8:0> represents an address in a TLB (translation look-aside buffer or address translation buffer) 40 and corresponds to RAM-ACCS-ADRS <8:0> shown in FIG. 10. The TLB 40 will be described in detail later.

Referring back to FIG. 11A, VA <63:22> is a tag having a 42-bit structure (hereinafter to be described as TLB-TAG <41:0>; refer to FIG. 12A), and this is used as an index in the TLB 40. This TLB-TAG <41:0> corresponds to TLB-TAG <41:0> in the TLB 40.

On the other hand, the physical address PA in the page table 30 has a 43-bit structure <42:0>, as shown in FIG. 11B. In this physical address PA <42:0>, PA <12:0> is an offset value having a 13-bit structure (hereinafter to be described as Off-SET <12:0>), and this is equivalent to Off-SET <12:0> shown in FIG. 11A. PA <42:13> is data corresponding to the physical address (hereinafter to be described as TLB-DATA <29:0>; refer to FIG. 12B).

If the TLB 40 is not available but the address translation is to be carried out, a not shown instruction processing section of the CPU 10 must make access to the main memory 20 and translates the virtual address VA into the physical address PA with reference to the page table 30.

However, when the CPU 10 makes access to the main memory 20 and refers to the page table 30 for the address translation, a lot of processing time is disadvantageously required. This results in low processing speed.

To overcome the time problem, the TLB 40 is provided in a not shown RAM (random access memory) in the CPU 10. This RAM can be accessed at a high speed.

This TLB 40 has 512 entries, for example. Assume that, in the TLB 40, values are expressed in hexadecimal numbers such as "0000" and "2aaa 8000 0000". In each entry of the TLB 40, there are stored, TLB-TAG <41:0> (tag) as an index, and TLB-DATA <29:0> (data) corresponding to the physical address, as TLB data respectively.

TLB-TAG <41:0> in the TLB 40 corresponds to TLB-TAG <41:0> in the virtual address VA (refer to FIG. 11A). TLB-DATA <29:0> in the TLB 40 corresponds to TLB-DATA <29:0> in the physical address PA (refer to FIG. 11B).

In the above structure, at the time of carrying out a data access to the main memory 20, the instruction processing section (not shown) of the CPU 10 searches the TLB 40 by using RAM-ACCS-ADRS <8:0> that is included in the virtual address VA corresponding to the instruction code.

Next, the instruction processing section reads TLB-TAG <41:0> (for example, 2aaa 8000 0000) and TLB-DATA <29:0> (for example, 0000 07f8) that are stored in the address shown by RAM-ACCS-ADRS <8.0> from the TLB 40.

Next, the instruction processing section compares the above TLB-TAG <41:0> (for example, 2aaa 8000 0000) with TLB-TAG <41:0> included in the virtual address VA.

Assume that both TLB-TAG <41:0> coincide with each other. The instruction processing section reads the corresponding TLB-DATA <29:0> (in this case, 0000 07f8) from the TLB 40 as HIT (TLB hit). Then, the instruction processing section combines this TLB-DATA <29:0> with Off-SET <12:0> included in the virtual address VA, and generates a physical address PA, as shown in FIG. 11B.

The instruction processing section carries out a data access to the main memory 20 based on the physical address PA.

Moreover, when it stores execution result data in a main memory 20 after an instruction is executed by the instruction processing section based on an instruction code. TLB 40 mentioned above is referred to and address translation processing for changing the virtual address VA into a physical address PA is performed.

When TLB-TAG <41:0> of the TLB 40 and TLB-TAG <41:0> included in the virtual address VA do not coincide with each other (MISS (TLB miss)), the page table 30 is referred to, and the virtual address VA is translated into the physical address PA.

When a TLB miss has occurred, TLB data that includes TLB-TAG <41:0> included in the virtual address VA and TLB-DATA <29:0> included in the physical address PA, as a pair, are stored into the TLB 40. TLB data is stored in the address shown by RAM-ACCS-ADRS <8:0> that is included in the virtual address VA.

Based on this, from the next time, the TLB 40 is used to translate the virtual address VA into the physical address PA.

There are two kinds of virtual addresses VA. They are an instruction virtual address, and an operand virtual address. The instruction virtual address corresponds to a physical address at which an instruction code is stored. Therefore, the virtual address VA from which the instruction processing section reads the instruction code by making access to the main memory 20 is the instruction virtual address. Hereinafter, the access relating to the instruction virtual address will be called an instruction access.

On the other hand, the operand virtual address corresponds to the physical address from/into which data of a result of the execution of an instruction is read/stored in the main memory 20, when the instruction is executed based on the instruction code. Therefore, the virtual address VA at which the instruction processing section stores data of the execution result by making access to the main memory 20 is the operand virtual address. Hereinafter, the access relating to the operand virtual address will be called an operand access.

Similarly, there are two kinds of TLB data stored in the TLB 40. They are operand TLB data, and instruction TLB data. The operand TLB data corresponds to the operand virtual address. On the other hand, the instruction TLB data corresponds to the instruction virtual address.

Referring to FIG. 10, the operand TLB data and the instruction TLB data coexist in one TLB 40. When there is an operand access to the page table 30 due to a TLB miss, the operand TLB data is stored into the TLB 40.

Similarly, when there is an instruction access to the page table 30 due to a TLB miss, the instruction TLB data is stored into the TLB 40.

However, the TLB data of the same RAM-ACCS-ADRS <8:0> is stored into the same address. Therefore, the TLB data that is stored this time is overwritten onto the TLB data stored in the past, regardless of the instruction TLB data and the operand TLB data.

Conventionally, in the pipeline control, an access collision has occurred that an operand access and an instruction access are generated at the same time.

In this case, one of the accesses becomes valid, and the other access is abandoned. For example, when the operand access is valid, the address translation that uses the TLB 40 is executed corresponding to the operand access. On the other hand, the instruction access is retried by the instruction processing section, after a time out due to the abandon. Therefore, there is a problem that the processing speed of the address translation is lowered because of the time loss following the time out.

Further, conventionally, the operand TLB data and the instruction TLB data have been stored indiscriminately in a mixed state in the TLB 40. Therefore, when a TLB miss of the operand access occurs continuously and when overwriting of the entry occurs continuously, the proportion of the operand TLB data in the TLB 40 increases.

On the other hand, the proportion of the instruction TLB data in the TLB 40 decreases, and a TLB hit rate is lowered. In this instance, as the number of access to the page table 30 increases, the processing speed is lowered as a result.

SUMMARY OF THE INVENTION

It is an object of the present invention to provide an address translation apparatus, an address translation method, and a two-layer address translation apparatus that can carry out an address translation at a high speed.

The address translation apparatus according to one aspect of the present invention has an address translation buffer including an operand address translation buffer, which stores operand address translation data for translation of an operand virtual address into a physical address, and an instruction address translation buffer, which stores instruction address translation data for translation of an instruction virtual address into a physical address, the operand address translation buffer and the instruction address translation buffer having a fixed area and sharing the same memory; an operand access control unit that carries out control to execute an operand access with priority, and to hold an instruction virtual address corresponding to an instruction access, when an access collision has occurred that the operand access to the operand address translation buffer and the instruction access to the instruction address translation buffer are generated at the same time; and an instruction access control unit that carries out control to execute an instruction access after finishing the operand access, and to translate the instruction virtual address held into a physical address based on data stored in the instruction address translation buffer.

The address translation method according to another aspect of the present invention uses an address translation buffer including an operand address translation buffer, which stores operand address translation data for translation of an operand virtual address into a physical address, and an instruction address translation buffer, which stores instruction address translation data for translation of an instruction virtual address into a physical address, the operand address translation buffer and the instruction address translation buffer having a fixed area and sharing the same memory. The address translation method comprises an operand access control step of carrying out control to execute an operand access with priority, and to hold an instruction virtual address corresponding to an instruction access, when an access collision has occurred that the operand access to the operand address translation buffer and the instruction access to the instruction address translation buffer are generated at the same time; and an instruction access control step of carrying out control to execute an instruction access after finishing the operand access, and to translate the held instruction virtual address into a physical address by using the instruction address translation buffer.

The two-layer address translation apparatus according to still another aspect of the present invention has a lower address translating unit that includes an address translation buffer including an operand address translation buffer, which stores operand address translation data for translation of an operand virtual address into a physical address, and an instruction address translation buffer, which stores instruction address translation data for translation of an instruction virtual address into a physical address, the operand address translation buffer and the instruction address translation buffer having a fixed area and sharing the same memory; an operand access control unit that carries out control to execute an operand access with priority, and hold an instruction virtual address corresponding to an instruction access, when an access collision has occurred that the operand access to the operand address translation buffer and the instruction access to the instruction address translation buffer are generated at the same time; and an instruction access control unit that carries out control to execute an instruction access after finishing the operand access, and translating the held instruction virtual address into a physical address by using the instruction address translation buffer. Moreover, there is provided a higher operand address translating unit that can be accessed at a higher speed than the operand address translation buffer, and that holds a part of operand address translation data stored in the operand address translation buffer, translates the operand virtual address into the physical address according to the operand access, and requests the lower address translating unit to carry out the translation when it is not possible to carry out the translation; and a higher instruction address translating unit that can be accessed at a higher speed than the instruction address translation buffer, and that holds a part of instruction address translation data stored in the instruction address translation buffer, translates the instruction virtual address into the physical address according to the instruction access, and requests the lower address translating unit to carry out the translation when it is not possible to carry out the translation.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a diagram that shows a first truth table 111a in a selection signal generating circuit 110 shown in FIG. 1.

DETAILED DESCRIPTIONS

Exemplary embodiments of the address translation apparatus, an address translation method, and a two-layer address translation apparatus relating to the present invention will be explained in detail below with reference to the accompanying drawings.

Figure 1:
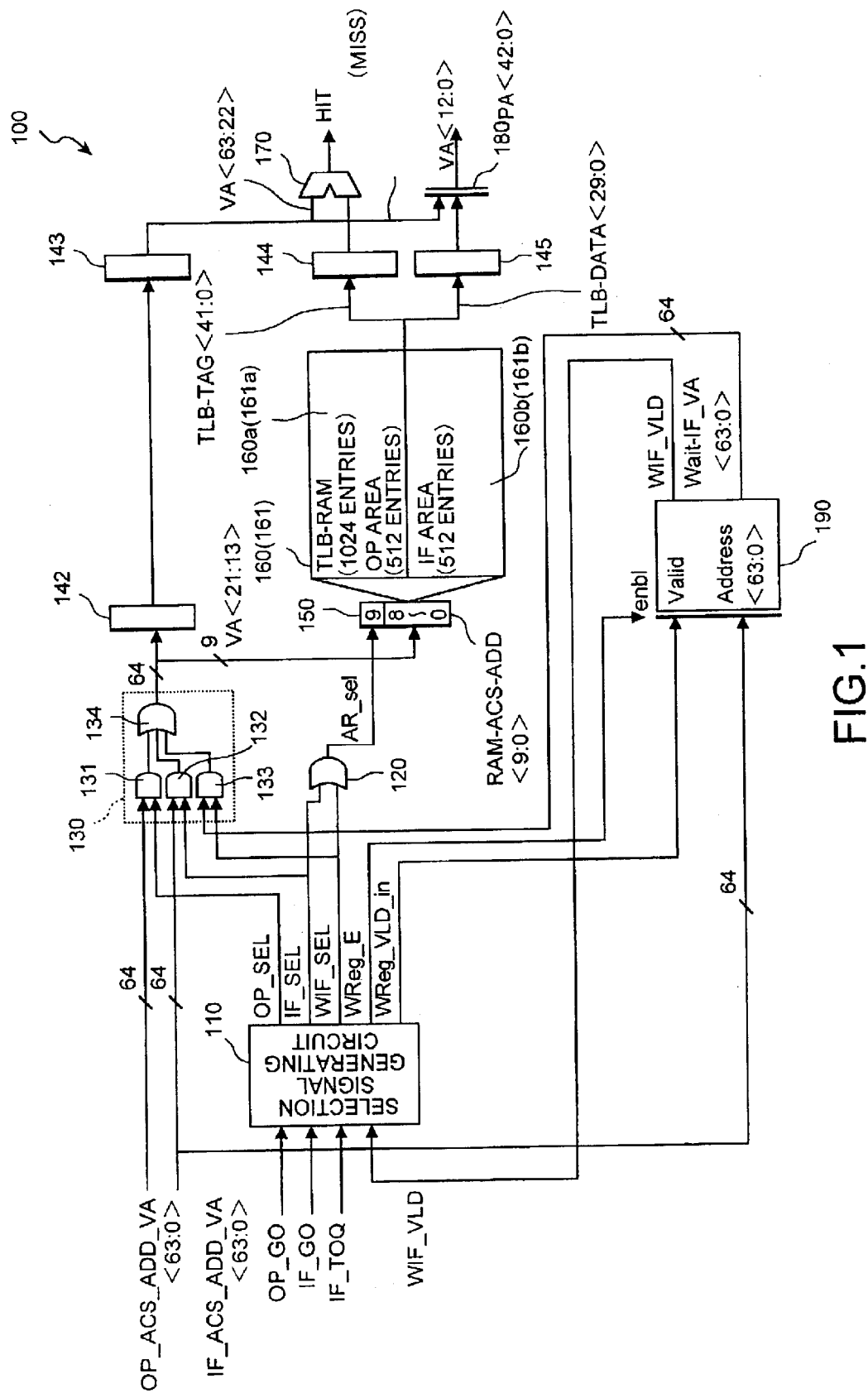
FIG. 1 is a block diagram that shows a structure of an address translation apparatus according to the first embodiment of the present invention.

FIG. 1 is a block diagram that shows a structure of an address translation apparatus 100 according to the first embodiment of the present invention. This address translation apparatus 100 carries out address translation from a virtual address into a physical address at a high speed in a computer system of a virtual storage system. Actually, the address translation apparatus 100 constitutes a part of the processor such as a CPU.

Figure 11A:
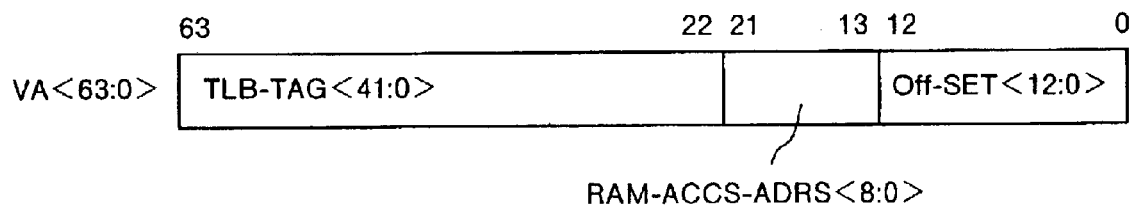
FIG. 11A shows data structure of a virtual address VA and FIG. 11B shows a data structure of a physical address PA.

In the address translation apparatus 100, OP_ACS_ADD_VA <63:0> is an operand virtual address corresponding to the operand access, and this has the same data structure as that of the virtual address VA shown in FIG. 11A.

On the other hand, IF_ACS_ADD_VA <63:0> is an instruction virtual address corresponding to the instruction access, and this has the same data structure as that of the virtual address VA.

The address translation apparatus 100 translates OP_ACS_ADD_VA (operand virtual address) and IF_ACS_ADD_VA (instruction virtual address) into a physical address PA (the output of a combining circuit 180), by using a TLB 161. The TLB 161 will be described in detail later.

Figure 2:
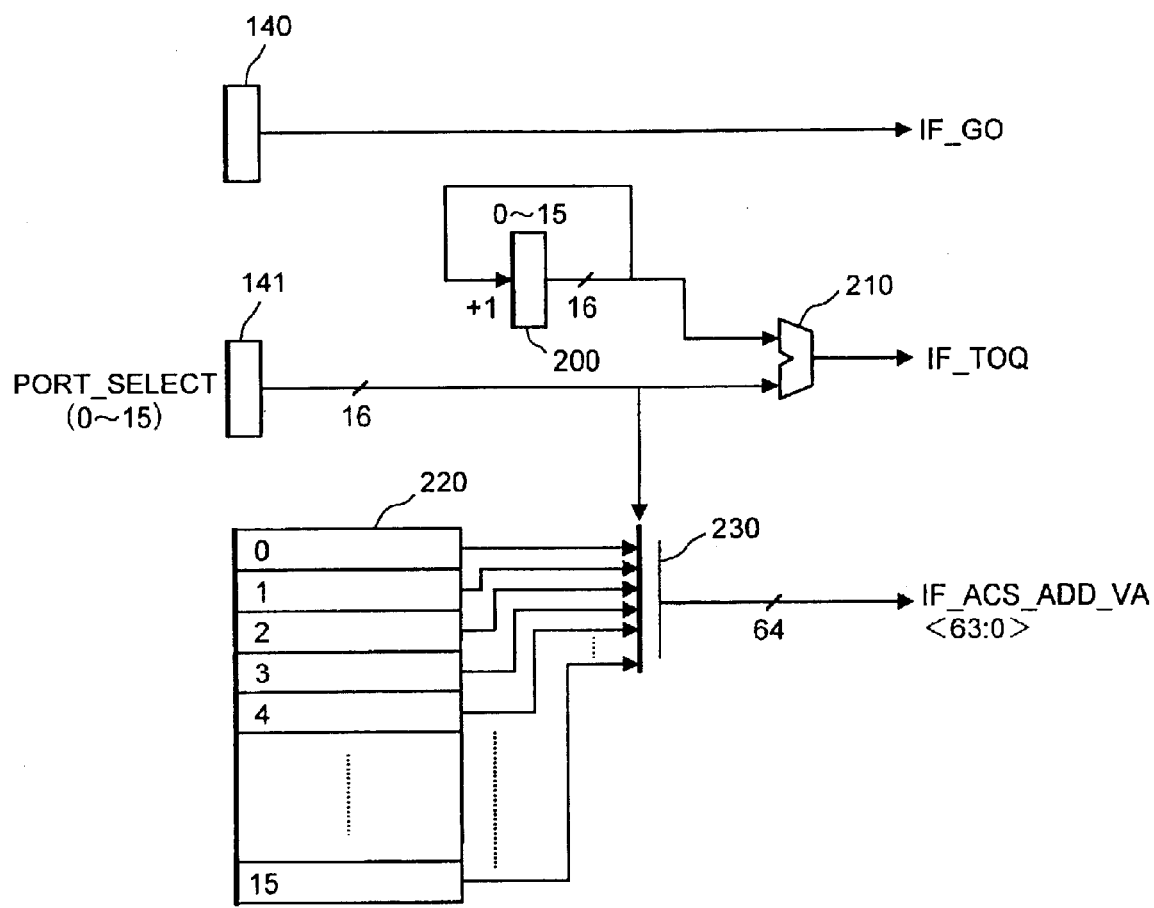
FIG. 2 is a block diagram that shows a structure of the address translation apparatus according to the first embodiment.

FIG. 2 shows a pre-stage circuit that is provided at a pre-stage of the address translation apparatus 100 shown in FIG. 1. In FIG. 2, IF_GO (instruction access request signal) is a signal that shows that IF_ACS_ADD_VA has been output, that is, an instruction access has been requested for.

This IF_GO (instruction access request signal) is output from a latch circuit 140 at a timing when IF_ACS_ADD_VA (instruction virtual address) is output from a selecting circuit 230. This IF_GO is input to a selection signal generating circuit 110.

In a fetch port 220 shown in FIG. 2, IF_ACS_ADD_VA (instruction virtual address) are stored in order as a queue starting from a port 0 to which access has been requested. A selector 141 selects a port (IF_ACS_ADD_VA (instruction virtual address)) at which it is considered possible to carry out execution from among ports 0 to 15 of the fetch port 220.

Usually, the selector 141 selects a port that has a highest priority (a port at which the oldest address is stored). However, when the IF_ACS_ADD_VA (instruction virtual address) is being accessed, the selector 141 selects a port that has a next highest priority. When the access of the port has been finished, this port is cleared.

A value of a register 200 shows a port where IF_ACS_ADD_VA (instruction virtual address) having a highest priority at present is being stored. When the access to the port shown by the register 200 has been finished, the register 200 increases the value by one. For example, assume that the value of the register 200 is 0. When the access to the port 0 has been finished, the register 200 updates the value from 0 to 1.

When the access to the port 1 corresponding to the updated value 1 has already been finished, the register 200 further updates the value from 1 to 2. For example, the value of the register 200 is 0 and the access to the port 0 has been finished. When the value of the register 200 has been updated to 1, and also when the access to the port 1 has already been finished (that is, when the access to the port 1 has been finished during the access to the port 0), the register 200 further updates the value from 1 to 2.

A comparator circuit 210 compares the value of the register 200 with the port selected by the selector 141. When both signals coincide with each other, that is, when a port selected by the selector 141 is the port that has a highest priority among ports that are valid at present, the comparator circuit 210 outputs IF_TOQ (instruction wait matrix header priority signal).

In other words, when IF_TOQ (instruction wait matrix header priority signal) has been output, this means that IF_ACS_ADD_VA (instruction virtual address) is the address that has a highest priority among addresses to which access has been awaited in the fetch port 220.

IF_TOQ (instruction wait matrix header priority signal) is input to the selection signal generating circuit 110 shown in FIG. 1.

The selection signal generating circuit 110 is a circuit that generates an output signal as a selection signal according to a state of input signals following a first truth table 111*a* shown in FIG. 3. The input signals are OP_GO (operand access request signal), IF_GO (instruction access request signal), IF_TOQ (instruction wait matrix header priority signal), and WIF_VLD (wait register valid signal).

OP_GO (operand access request signal) is a signal that shows that OP_ACS_ADD_VA (operand virtual address) has been output, that is, the operand access has been requested for.

IF_GO (instruction access request signal) is a signal that shows that IF_ACS_ADD_VA (instruction virtual address) has been output, that is, the instruction access has been requested for, as described above.

IF_TOQ (instruction wait matrix header priority signal) is a signal that shows that the address to which access has a highest priority has been selected from among IF_ACS_ADD_VA (instruction virtual address) that are stored in the fetch port 220 as described above. When this IF_TOQ (instruction wait matrix header priority signal) is 1, it is a signal that sets a higher priority to the address over other Wait-IF_VA (wait instruction virtual address) stored in a wait register 190.

WIF_VLD (Wait register valid signal) is a signal that shows that Wait-IF_VA (wait instruction virtual address) stored in the wait register 190 is valid.

On the other hand, output signals of the selection signal generating circuit 110 are OP_SEL (operand virtual address selection signal), IF_SEL (instruction virtual address selection signal), WIF_SEL (wait instruction virtual address selection signal), WReg_E (store permission signal), and WReg_VLD_in (wait register valid signal).

OP_SEL (operand virtual address selection signal) is a signal to make a virtual address selecting circuit 130, to be described later, select OP_ACS_ADD_VA (operand virtual address).

When OP_GO (operand access request signal) and IF_GO (instruction access request signal) are both 1, that is, when an access collision has occurred, OP_SEL (operand virtual address selection signal) becomes 1 to place a higher priority to the operand access, as shown in the first truth table 111*a*.

This is because the operand access has higher urgency over the instruction access to the computer system. By selecting the operand access, reduction in the system performance is avoided.

IF_SEL (instruction virtual address selection signal) is a signal to make the virtual address selecting circuit 130 select IF_ACS_ADD_VA (instruction virtual address).

WIF_SEL (wait instruction virtual address selection signal) is a signal to make the virtual address selecting circuit 130 select Wait-IF_VA (wait instruction virtual address).

WReg_E (store permission signal) is a signal to permit IF_ACS_ADD_VA (instruction virtual address) to be stored into the wait register 190 as Wait-IF_VA (wait instruction virtual address).

WReg_VLD_in (wait register valid signal) is a signal that shows that Wait-IF_VA (wait instruction virtual address) stored in the wait register 190 is valid.

Figures 4, 5:
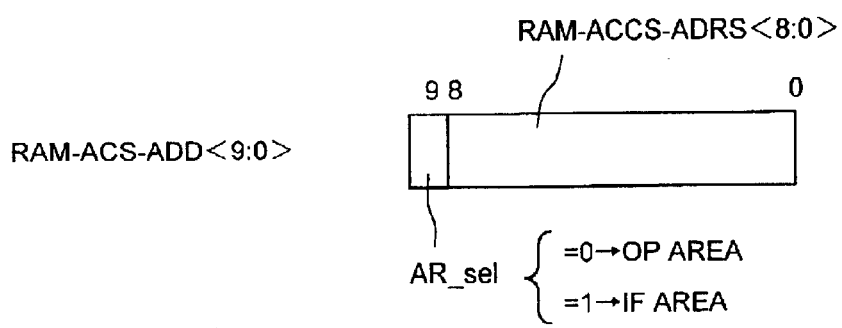
FIG. 4 is a diagram that shows a second truth table 111b in the selection signal generating circuit 110 shown in FIG. 1.
FIG. 5 is a diagram that shows a data structure of RAM-ACS-ADD data shown in FIG. 1.

In the first embodiment, when IF_TOQ (instruction wait matrix header priority signal) is not used, the selection signal generating circuit 110 operates based on a second truth table 111*b* shown in FIG. 4 in place of the first truth table 111*a*.

Referring back to FIG. 1, an OR circuit 120 takes OR of IF_SEL (instruction virtual address selection signal) and WIF_SEL (wait instruction virtual address selection signal), and outputs an area selection signal AR_sel.

This area selection signal AR_sel is a signal to select one of an OP (operand) area 160*a* (OP-TLB 161*a*) and an IF (instruction) area 160*b* (IF-TLB 161*b*) in a TLB-RAM 160 (TLB 161) to be described later.

Specifically, when the area selection signal AR_sel is 1, the IF area 160*b* (IF-TLB 161*b*) is selected. On the other hand, when the area selection signal AR_sel is 0, the OP area 160*a* (OP-TLB 161*a*) is selected.

The virtual address selecting circuit 130 is a circuit that selects one virtual address from among OP_ACS_ADD_VA (operand virtual address), IF_ACS_ADD_VA (instruction virtual address), and Wait-IF_VA (wait instruction virtual address).

This virtual address selecting circuit 130 includes AND circuits 131, 132 and 133, and an OR circuit 134. The AND circuit 131 takes AND of OP_ACS_ADD_VA (operand virtual address) and OP_SEL (operand virtual address selection signal).

The AND circuit takes AND of IF_ACS_ADD_VA (instruction virtual address) and IF_SEL (instruction virtual address selection signal). The AND circuit 133 takes AND of Wait-IF_VA (wait instruction virtual address) and WIF_SEL (wait instruction virtual address selection signal).

The OR circuit 134 takes logical OR of the outputs of the AND circuits 131 to 133. Outputs of the OR circuit 134 are OP_ACS_ADD_VA (operand virtual address), and IF_ACS_ADD_VA (instruction virtual address) or Wait-IF_VA (wait instruction virtual address), and take the same data structure as that of the virtual address VA.

The outputs of the OR circuit 134 are latched by a latch circuit 142. Further, the outputs of the latch circuit 142 are latched by a latch circuit 143.

The wait register 190 stores IF_ACS_ADD_VA (instruction virtual address) as Wait-IF_VA (wait instruction virtual address) based on WReg_E (store permission signal) from the selection signal generating circuit 110.

IF_ACS_ADD_VA (instruction virtual address) is stored into the wait register 190 on the condition that when an access collision has occurred that the operand access and the instruction access are generated at the same time, the operand access has a higher priority, and the instruction access is awaited.

A RAM access address generator 150 generates RAM-ACS-ADD <9:0> (RAM access address) that shows the address of the TLB-RAM 160 (TLB 161).

This RAM-ACS-ADD <9:0> has a 10-bit structure of RAM-ACCS-ADRS <8:0> and the area selection signal AR_sel, as shown in FIG. 5. RAM-ACCS-ADRS <8:0> is a virtual address VA <21:13> from the OR circuit 134.

The area selection signal AR_sel is a signal to select one of the OP (operand) area 160*a* (OP-TLB 161*a*) and the IF (instruction) area 160*b* (IF-TLB 161*b*) in the TLB-RAM 160 (TLB 161) shown in FIG. 1.

Figure 6:
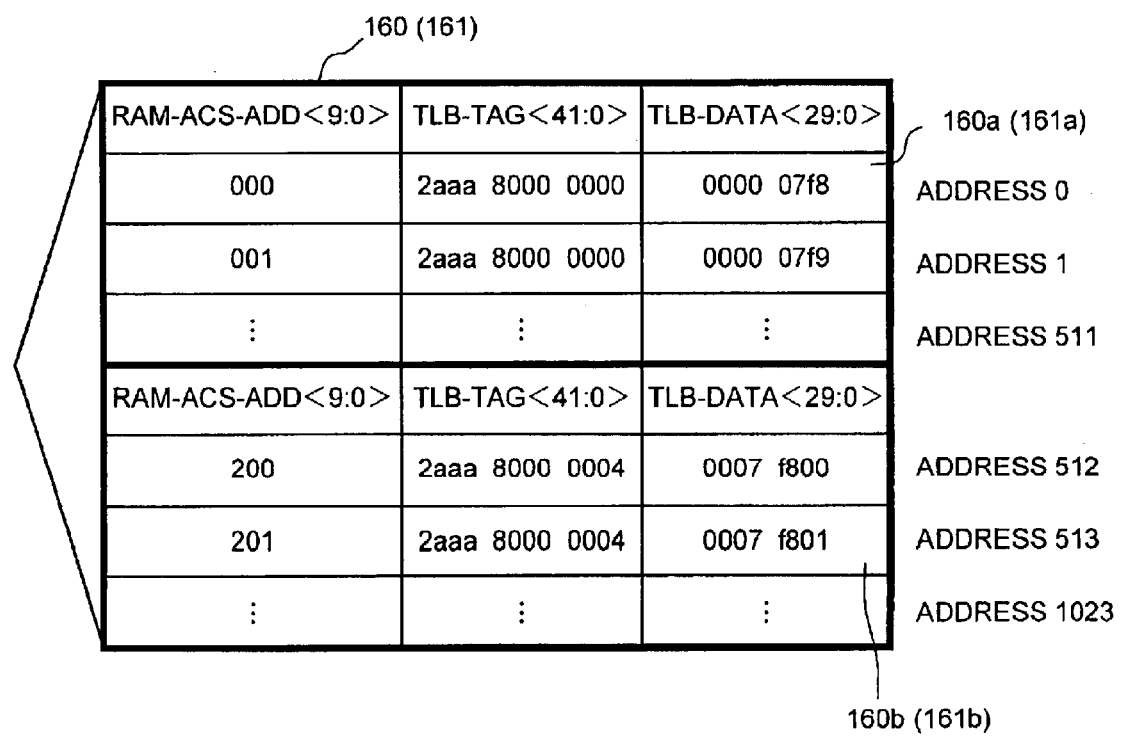
FIG. 6 is a diagram that shows a structure of a TLB-RAM 160 shown in FIG. 1.

The TLB-RAM 160 is provided with the TLB 161. This TLB 161 has 1024 entries (from address 0 to address 1023) as shown in FIG. 6. The TLB-RAM 160 is divided into two areas of the OP area 160*a* (512 entries) and the IF area 160*b* (512 entries). In the TLB-RAM 160, each value is expressed as a hexadecimal number.

The OP area 160*a* is provided with the OP-TLB 161*a*. In the entries of the OP-TLB 161*a*, there are stored, TLB-TAG <41:0> (tag) as an index, and TLB-DATA <29:0> (data) corresponding to a physical address, as operand TLB data. Only the operand TLB data is stored in the OP area 160*a*.

TLB-TAG <41:0> in the OP-TLB 161a corresponds to TLB-TAG <41:0> in the virtual address VA as OP_ACS_ADD_VA (operand virtual address). TLB-DATA <29:0> in the OP-TLB 161a corresponds to TLB-DATA <29:0> in the physical address PA.

On the other hand, the IF area 160b is provided with the IF-TLB 161b. In the entries of the IF-TLB 161b, there are stored TLB-TAG <41:0> (tag) as an index, and TLB-DATA <29:0> (data) corresponding to a physical address, as instruction TLB data. Only the instruction TLB data is stored in the IF-TLB 161b.

TLB-TAG <41:0> in the IF-TLB 161b corresponds to TLB-TAG <41:0> in the virtual address VA as IF_ACS_ADD_VA (instruction virtual address). TLB-DATA <29:0> in the IF-TLB 161b corresponds to TLB-DATA <29:0> in the physical address PA.

Referring back to FIG. 1, the latch circuit 144 reads and latches TLB-TAG <41:0> corresponding to RAM-ACS-ADD <9:0> (RAM access address) from the TLB 161.

The latch circuit 145 reads and latches TLB-DATA <29:0> corresponding to RAM-ACS-ADD <9:0> (RAM access address) from the TLB 161.

A comparator circuit 170 compares TLB-TAG <41:0> from the latch circuit 144 with VA <63:22> from the latch circuit 143. When both data coincide with each other, HIT (TLB hit) occurs. When TLB hit occurs, the combining circuit 180 combines TLB-DATA <29:0> from the latch circuit 145 with VA <12:0> from the latch circuit 143, and generates a physical address PA <42:0>.

When both data do not coincide with each other, the comparator circuit 170 sets MISS. In this case, the comparator circuit 170 refers to a page table 30 (refer to FIG. 10), and translates the virtual address VA into the physical address PA.

Operand Access

The operation of the address translation apparatus according to the first embodiment will be explained. First, only the operand access will be explained. OP_ACS_ADD_VA (operand virtual address) shown in FIG. 1 is input to the AND circuit 131, and OP_GO (operand access request signal) of 1 is input to the selection signal generating circuit 110.

Assume that IF_GO (instruction access request signal), IF_TOQ (instruction wait matrix header priority signal), and WIF_VLD (wait register valid signal) are all 0. Then, the selection signal generating circuit 110 outputs OP_SEL (operand virtual address selection signal) of 1 to the AND circuit 131 following the first truth table 111a.

The OR circuit 134 outputs OP_ACS_ADD_VA (operand virtual address).

At the next timing, the latch circuit 142 latches OP_ACS_ADD_VA (operand virtual address).

The RAM access address generator 150 generates RAM-ACS-ADD <9:0> (RAM access address) from RAM-ACCS-ADD <8:0> (RAM access address) and the area selection signal AR_sel (in this case, 0) that are included in the above OP_ACS_ADD_VA (operand virtual address), as shown in FIG. 5.

As the area selection signal AR_sel is 0, the OP area 160a (OP-TLB 161a) is selected.

At the next timing, the latch circuit 143 latches OP_ACS_ADD_VA (operand virtual address) from the latch circuit 142. Further, the latch circuit 144 latches TLB-TAG <41:0> corresponding to RAM-ACS-ADD <9:0> (RAM access address), by referring to the OP-TLB 161a shown in FIG. 6, using the RAM-ACS-ADD <9:0> generated by the RAM access address generator 150.

The latch circuit 145 latches TLB-DATA <29:0> corresponding to RAM-ACS-ADD <9:0> (RAM access address) by referring to the OP-TLB 161a, by using the RAM-ACS-ADD <9:0> (RAM access address).

The comparator circuit 170 compares VA <63:22> from the latch circuit 143 with TLB-TAG <41:0> from the latch circuit 144. When both data coincide with each other, the comparator circuit 170 sets HIT (TLB hit).

Figure 11B:
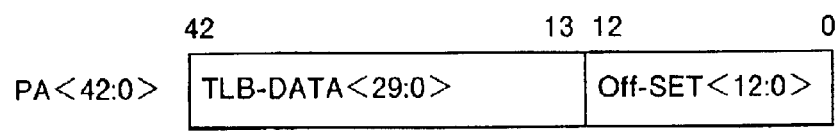
Figure 12A:
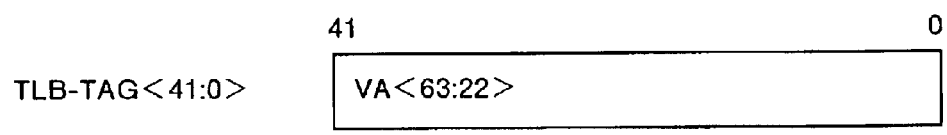
FIG. 12A shows data structure of TLB_TAG and FIG. 12B shows data structure of TLB_DATA.
Figure 12B:
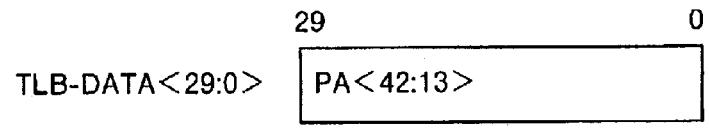

As shown in FIG. 11B, the combining circuit 180 combines VA <12:0> from the latch circuit 143 with TLB-DATA <29:0> from the latch circuit 145, and generates the physical address PA <42:0>. Based on the physical address PA, a data access to a not shown main memory is carried out.

When VA <63:22> from the latch circuit 143 does not coincide with TLB-TAG <41:0> from the latch circuit 144, the comparator circuit 170 sets MISS (TLB miss).

In this case, the page table 30 is referred to, and OP_ACS_ADD_VA (operand virtual address) is translated into the physical address PA.

When a TLB miss has occurred, TLB-TAG <41:0> obtained from the OP_ACS_ADD_VA (operand virtual address), and TLB-DATA <29:0> obtained from the page table 30 are stored in a pair, as operand TLB data, into the OP-TLB 161a.

At the next timing onward, OP_ACS_ADD_VA (operand virtual address) is translated into the physical address PA based on the OP-TLB 161a.

Instruction Access

A case of only the instruction access will be explained. IF_ACS_ADD_VA (instruction virtual address) shown in FIG. 1 is input to the AND circuit 132 and the wait register 190. At the same time, IF_GO (instruction access request signal) of 1 is input to the selection signal generating circuit 110.

Assume that OP_GO (operand access request signal), IF_TOQ (instruction wait matrix header priority signal), and WIF_VLD (wait register valid signal) are all 0. Then, the selection signal generating circuit 110 outputs IF_SEL (instruction virtual address selection signal) of 1 to the AND circuit 132 and the OR circuit 120 following the first truth table 111a.

The OR circuit 134 outputs IF_ACS_ADD_VA (instruction virtual address). The OR circuit 120 outputs the area selection signal AR_sel of 1.

At the next timing, the latch circuit 142 latches IF_ACS_ADD_VA (instruction virtual address).

The RAM access address generator 150 generates RAM-ACS-ADD <9:0> (RAM access address) from RAM-ACCS-ADD <8:0> (RAM access address) and the area selection signal AR_sel (in this case, 1) that are included in the above IF_ACS_ADD_VA (instruction virtual address), as shown in FIG. 5.

As the area selection signal AR_sel is 1, the IF area 160b (IF-TLB 161b) is selected.

At the next timing, the latch circuit 143 latches IF_ACS_ADD_VA (instruction virtual address) from the latch circuit 142. Further, TLB-TAG <41:0> and TLB-DATA <29:0> stored at the address assigned by the RAM-ACS-ADD <9:0> (RAM access address) generated by the RAM access address generator 150 are read out, and are latched by the latch circuit 144 and the latch circuit 145.

The comparator circuit 170 compares VA <63:22> from the latch circuit 143 with TLB-TAG <41:0> from the latch circuit 144. When both data coincide with each other, the comparator circuit 170 sets HIT (TLB hit).

As shown in FIG. 11B, the combining circuit 180 combines VA <12:0> from the latch circuit 143 with TLB-DATA <29:0> from the latch circuit 145, and generates the physical address PA <42:0>. Based on the physical address PA, an instruction code is read from the main memory.

When VA <63:22> from the latch circuit 143 does not coincide with TLB-TAG <41:0> from the latch circuit 144, the comparator circuit 170 sets MISS.

In this case, the page table 30 (refer to FIG. 10) is referred to, and IF_ACS_ADD_VA (instruction virtual address) is translated into the physical address PA.

When a TLB miss has occurred, TLB-TAG <41:0> obtained from the IF_ACS_ADD_VA (instruction virtual address), and TLB-DATA <29:0> obtained from the page table 30 are stored in a pair, as instruction TLB data, into the IF-TLB 161b.

At the next timing onward, IF_ACS_ADD_VA (instruction virtual address) is translated into the physical address PA based on the IF-TLB 161b.

Access Collision

A simultaneous occurrence of the operand access and the instruction access according to the pipeline control, that is, the occurrence of an access collision, will be explained. OP_ACS_ADD_VA (operand virtual address) shown in FIG. 1 is input to the AND circuit 131, and OP_GO (operand access request signal) of 1 is input to the selection signal generating circuit 110.

Further, IF_ACS_ADD_VA (instruction virtual address) is input to the AND circuit 132, and IF_GO (instruction access request signal) of 1 is input to the selection signal generating circuit 110.

Assume that both IF_TOQ (instruction wait matrix header priority signal) and WIF_VLD (wait register valid signal) are 0. Then, the selection signal generating circuit 110 outputs OP_SEL (operand virtual address selection signal) of 1 to the AND circuit 131 and outputs IF_SEL (instruction virtual address selection signal) of 0 to the AND circuit 132, following the first truth table 111a.

In other words, when the access collision has occurred, a higher priority is placed to the operand access over the instruction access. Based on this, the OR circuit 134 outputs OP_ACS_ADD_VA (operand virtual address).

The selection signal generating circuit 110 outputs WReg_E (store permission signal) of 1 and WReg_VLD_in (wait register valid signal) of 1 to the wait register 190.

As a result, IF_ACS_ADD_VA (instruction virtual address) is stored as Wait-IF_VA (wait instruction virtual address) in the wait register 190.

Thereafter, when OP_ACS_ADD_VA (operand virtual address) has been translated into the physical address PA through the above operation of operand access, WIF_VLD (wait register valid signal) of 1 is output to the selection signal generating circuit 110 and Wait-IF_VA (wait instruction virtual address) is output to the AND circuit 133 from the wait register 190.

Assume that OP_GO (operand access request signal), IF_GO (instruction access request signal), and IF_TOQ (instruction wait matrix header priority signal) are all 0. Then, the selection signal generating circuit 110 outputs WIF_SEL (wait instruction virtual address selection signal) of 1 to the AND circuit 133 and the OR circuit 120, following the first truth table 111a.

The OR circuit 134 outputs Wait-IF_VA (wait instruction virtual address). The OR circuit 120 outputs the area selection signal AR_sel of 1.

At the next timing, the latch circuit 142 latches Wait-IF_VA (wait instruction virtual address).

The RAM access address generator 150 generates RAM-ACS-ADD <9:0> (RAM access address) from RAM-ACCS-ADD <8:0> (RAM access address) and the area selection signal AR_sel (in this case, 1) that are included in the Wait-IF_VA (wait instruction virtual address), as shown in FIG. 5.

As the area selection signal AR_sel is 1, the IF area 160b (IF-TLB 161b) is selected.

At the next timing, the latch circuit 143 latches Wait-IF_VA (wait instruction virtual address) from the latch circuit 142. Further, TLB-TAG <41:0> and TLB-DATA <29:0> stored at the address assigned by the RAM-ACS-ADD <9:0> (RAM access address) generated by the RAM access address generator 150 are read out, and are latched by the latch circuit 144 and the latch circuit 145.

The comparator circuit 170 compares VA <63:22> from the latch circuit 143 with TLB-TAG <41:0> from the latch circuit 144. When both data coincide with each other, the comparator circuit 170 sets HIT (TLB hit).

As shown in FIG. 11B, the combining circuit 180 combines VA <12:0> from the latch circuit 143 with TLB-DATA <29:0> from the latch circuit 145, and generates the physical address PA <42:0>. Based on the physical address PA, an instruction code is read from the main memory.

When VA <63:22> from the latch circuit 143 does not coincide with TLB-TAG <41:0> from the latch circuit 144, the comparator circuit 170 sets MISS.

In this case, the page table 30 is referred to, and Wait-IF_VA (wait instruction virtual address) is translated into the physical address PA.

When a TLB miss has occurred, TLB-TAG <41:0> obtained from the Wait-IF_VA (wait instruction virtual address), and TLB-DATA <29:0> included in the physical address PA are stored in a pair, as instruction TLB data, into the IF-TLB 161b.

At the next timing onward, IF_VA ( instruction virtual address) is translated into the physical address PA based on the IF-TLB 161b.

When IF_GO Has Been Input

An input of IF_GO (instruction access request signal) of 1 to the selection signal generating circuit 110 after OP_ACS_ADD_VA (operand virtual address) has been translated into the physical address PA in the state that Wait-IF_VA (wait instruction virtual address) is being stored in the wait register 190 will be explained.

In this case, the address translation of Wait-IF_VA (wait instruction virtual address) has a higher priority over the address translation of IF_ACS_ADD_VA (instruction virtual address) corresponding to IF_GO (instruction access request signal).

In other words, in this case, the latch circuit 140 outputs IF_GO (instruction access request signal) of 1 to the selection signal generating circuit 110. Further, WIF_VLD (wait register valid signal) of 1 is output from the wait register 190 to the selection signal generating circuit 110. OP_GO (operand access request signal) and IF_TOQ (instruction wait matrix header priority signal) are both 0.

The selection signal generating circuit 110 outputs WIF_SEL (wait instruction virtual address selection signal) to the AND circuit 133 following the first truth table 111a. The selection signal generating circuit 110 outputs IF_SEL (instruction virtual address selection signal) of 0 to the AND circuit 132, and outputs OP_SEL (operand virtual address selection signal) of 0 to the AND circuit 131.

The OR circuit 134 outputs Wait-IF_VA (wait instruction virtual address).

As a result, the selection signal generating circuit 110 outputs Wreg_E (store permission signal) of 1 and Wreg_VLD_in (wait register valid signal) of 1 to the wait register 190.

As a result, IF_ACS_ADD_VA (instruction virtual address) and Wreg-VLD-in (wait register valid signal) are stored in the wait register 190.

Thereafter, when Wait-IF_VA (wait instruction virtual address) has been translated into the physical address PA through the above operation, WIF_VLD (wait register valid signal) of 1 is output to the selection signal generating circuit 110 and Wait-IF_VA (wait instruction virtual address) is output to the AND circuit 133 from the wait register 190.

Assume that OP_GO (operand access request signal), IF_GO (instruction access request signal), and IF_TOQ (instruction wait matrix header priority signal) are all 0. Then, the selection signal generating circuit 110 outputs WIF_SEL (wait instruction virtual address selection signal) of 1 to the AND circuit 133 and the OR circuit 120, following the first truth table 111*a*. Thereafter, Wait-IF_VA (wait instruction virtual address) is translated into the physical address PA through the above operation.

When IF_TOQ Has Been Input)

An input of IF_TOQ (instruction wait matrix header priority signal) of 1 to the selection signal generating circuit 110 after OP_ACS_ADD_VA (operand virtual address) has been translated into the physical address PA in the state that Wait-IF_VA (wait instruction virtual address) is being stored in the wait register 190 will be explained.

In this case, the address translation of IF_ACS_ADD_VA (instruction virtual address) corresponding to IF_TOQ (instruction wait matrix header priority signal) has a higher priority over the address translation of Wait-IF_VA (wait instruction virtual address).

In other words, in this case, the comparator circuit 210 outputs IF_TOQ (instruction wait matrix header priority signal) of 1 to the selection signal generating circuit 110. At the same time, the latch circuit 140 outputs IF_GO (instruction access request signal) of 1 to the selection signal generating circuit 110. OP_GO (operand access request signal) is 0.

At the same time, the selecting circuit 230 outputs IF_ACS_ADD_VA (instruction virtual address) to the AND circuit 132. At this time, WIF_VLD (wait register valid signal) of 1 is output to the selection signal generating circuit 110, and Wait-IF_VA (wait instruction virtual address) is output to the AND circuit 133 from the wait register 190.

The selection signal generating circuit 110 outputs IF_SEL (instruction virtual address selection signal) of 1 to the AND circuit 132 and the OR circuit 120 following the first truth table 111*a*. The selection signal generating circuit 110 also outputs WIF_SEL (wait instruction virtual address selection signal) of 0 to the AND circuit 133.

The OR circuit 134 outputs IF_ACS_ADD_VA (instruction virtual address). The OR circuit 120 outputs the area selection signal AR_sel of 1.

At the next timing, the latch circuit 142 latches IF_ACS_ADD_VA (instruction virtual address). Thereafter, through the above operation, when TLB hit has occurred, IF_ACS_ADD_VA (instruction virtual address) is translated into the physical address PA based on the IF-TLB 161*b*.

When IF_TOQ and OP_GO Have Been Input

A simultaneous input of OP_GO (operand access request signal) of 1 and IF_TOQ (instruction wait matrix header priority signal) of 1 to the selection signal generating circuit 110 after OP_ACS_ADD_VA (operand virtual address) has been translated into the physical address PA in the state that Wait-IF_VA (wait instruction virtual address) is being stored in the wait register 190, and a subsequent occurrence of an access collision, will be explained.

In this case, Wait-IF_VA (wait instruction virtual address) stored in the wait register 190 is abandoned, and IF_ACS_ADD_VA (instruction virtual address) corresponding to IF_TOQ (instruction wait matrix header priority signal) is stored in place of this. The address translation of OP_ACS_ADD_VA (operand virtual address) has a higher priority.

In this case, OP_ACS_ADD_VA (operand virtual address) has been input to the AND circuit 131. IF_ACS_ADD_VA (instruction virtual address) has been input to the AND circuit 132. Wait-IF_VA (wait instruction virtual address) has been input to the AND circuit 133.

The signals OP_GO (operand access request signal), IF_GO (instruction access request signal), IF_TOQ (instruction wait matrix header priority signal), and WIF_VLD (wait register valid signal) (all of which are 1) are input to the selection signal generating circuit 110.

Based on this, the selection signal generating circuit 110 outputs OP_SEL (operand virtual address selection signal) of 1, IF_SEL (instruction virtual address selection signal) of 0, and WIF_SEL (wait instruction virtual address selection signal) of 0 to the AND circuit 131, the AND circuit 132, and the AND circuit 133 respectively, following the first truth table 111*a*.

The OR circuit 134 outputs OP_ACS_ADD_VA (operand virtual address) accordingly.

The selection signal generating circuit 110 outputs WReg_E (store permission signal) of 1 and WReg_VLD_in (wait register valid signal) of 1 to the wait register 190.

As a result, in the wait register 190, Wait-IF_VA (wait instruction virtual address) that has been stored in advance is abandoned, and IF_ACS_ADD_VA (instruction virtual address) corresponding to IF_TOQ (instruction wait matrix header priority signal) is stored as Wait-IF_VA (wait instruction virtual address).

When OP_ACS_ADD_VA (operand virtual address) has been translated into the physical address PA through the operation of operand access, Wait-IF_VA (wait instruction virtual address) corresponding to IF_TOQ (instruction wait matrix header priority signal) is translated into the physical address PA through the above operation.

As explained above, according to the first embodiment, when the access collision has occurred that the operand access to the OP-TLB 161*a* and the instruction access to the IF-TLB 161*b* are generated at the same time, the operand access is executed with priority. Thereafter, Wait-IF_VA (wait instruction virtual address) held in the wait register 190 is translated into the physical address PA. Therefore, there occurs no time loss due to the retry, and it becomes possible to carry out the address translation at a high speed.

According to the first embodiment, there is provided the TLB 161 in which the OP-TLB 161*a* and the IF-TLB 161*b* have fixed areas (512 entries) respectively, and share the same TLB-RAM 160. As there is a limit in the fixed area, the capacity of one of the address translation buffers does not increase in excess of the capacity of the other address translation buffer. As the TLB hit rate of address translation is stabilized, it becomes possible to stabilize the processing speed of address translation.

According to the first embodiment, the operand access to the OP-TLB 161*a* is controlled based on the area selection signal AR_sel (operand selection flag) of 0 and RAM-ACS-ADD <9:0> (RAM access address), and the instruction access to the IF-TLB 161*b* is controlled based on the area selection signal AR_sel (instruction selection flag) of 1 and RAM-ACS-ADD <9:0> (RAM access address). Therefore, it is possible to efficiently carry out access to the OP-TLB 161*a* and the IF-TLB 161*b*.

According to the first embodiment, when the access collision has occurred that a new operand access and the instruction access corresponding to Wait-IF_VA (wait instruction virtual address) held in the wait register 190 are generated at the same time, the new operand access is executed with priority. Thereafter, the instruction access corresponding to Wait-IF_VA (wait instruction virtual address) held in the wait register 190 is executed. Therefore, there occurs no time loss due to the retry, and it becomes possible to carry out the address translation at a high speed.

According to the first embodiment, when the access collision has occurred that the instruction access corresponding to IF_TOQ (instruction wait matrix header priority signal) and the instruction access corresponding to Wait-IF_VA (wait instruction virtual address) held in the wait register 190 are generated at the same time, the former instruction access is executed with priority. Thereafter, the instruction access corresponding to Wait-IF_VA (wait instruction virtual address) held in the wait register 190 is executed. Therefore, it is possible to carry out the instruction access by interruption.

Figure 7:
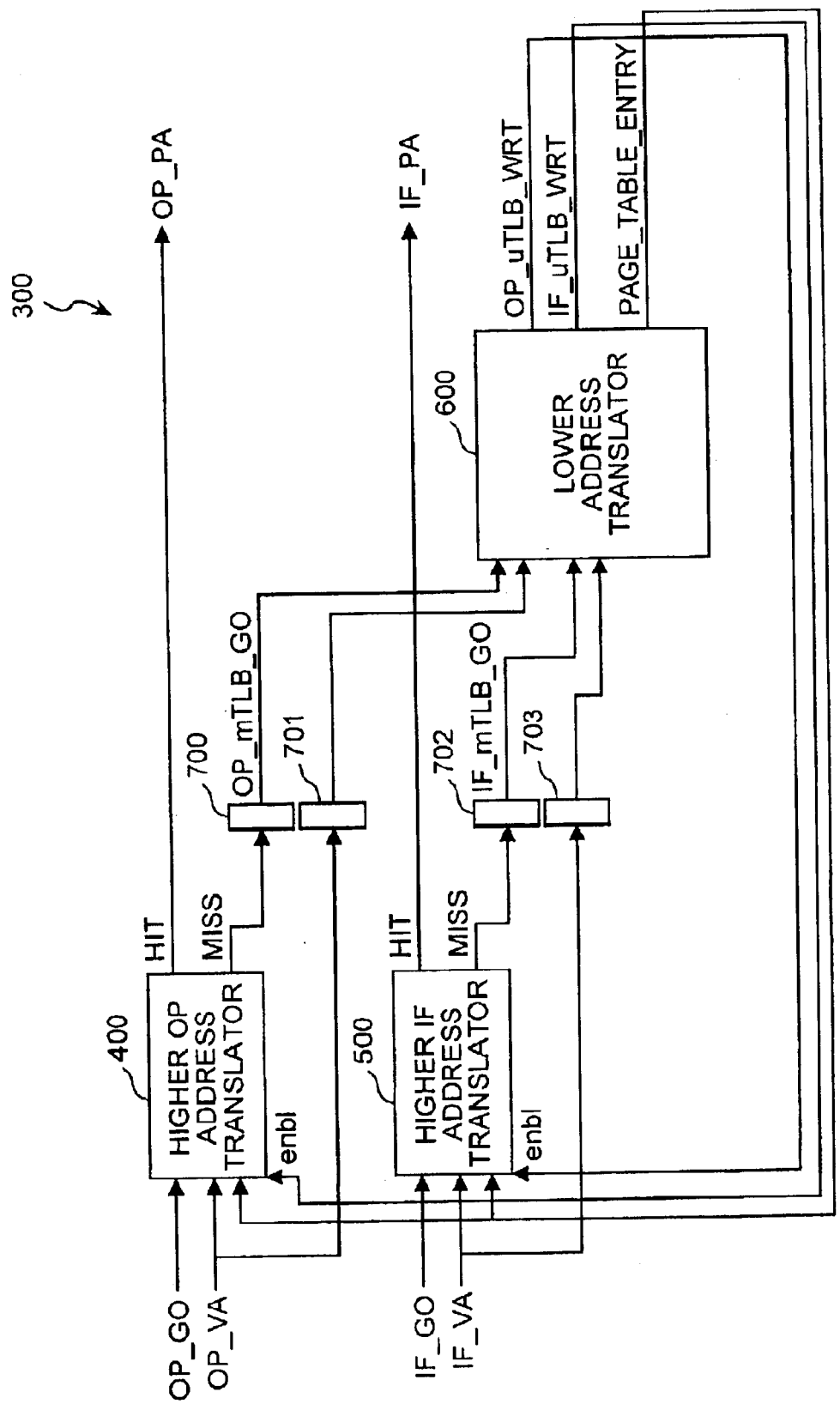
FIG. 7 is a block diagram that shows a structure of a two-layer address translation apparatus according to the second embodiment of the present invention.

FIG. 7 is a block diagram that shows a structure of a two-layer address translation apparatus 300 according to the second embodiment of the present invention. This two-layer address translation apparatus 300 including a higher OP address translator 400 and a higher IF address translator 500 as a higher layer TLB, and a lower address translator 600 as a lower layer TLB. Actually, the address translation apparatus 300 constitutes a part of the processor such as a CPU.

The lower address translator 600 has the same function and structure as those of the address translation apparatus 100 shown in FIG. 1, and searches for an entry in the page table 30 by using the same table as the TLB 161. This table is not shown because it is same as the TLB 161.

The higher OP address translator 400 stores a part of operand TLB data stored in the TLB of the lower address translator 600, in an operand TLB.

This higher OP address translator 400 can carry out the processing at a higher speed than the lower address translator 600. OP_VA (operand virtual address) is an operand virtual address corresponding to the operand access, and has the same structure as that of the virtual address VA.

OP_GO (operand access request signal) is a signal that shows that OP_VA (operand virtual address) has been output, that is, the operand access has been requested for.

When OP_GO (operand access request signal) and OP_VA (operand virtual address) have been input, the higher OP address translator 400 searches the operand TLB. When the searching has HIT (TLB hit), the higher OP address translator 400 translates OP_VA (operand virtual address) into OP_PA (operand physical address) by using the operand TLB.

When the searching has been MISS, the higher OP address translator 400 outputs OP_mTLB_GO (operand access request signal) to make the lower address translator 600 carry out address translation.

Figure 8:
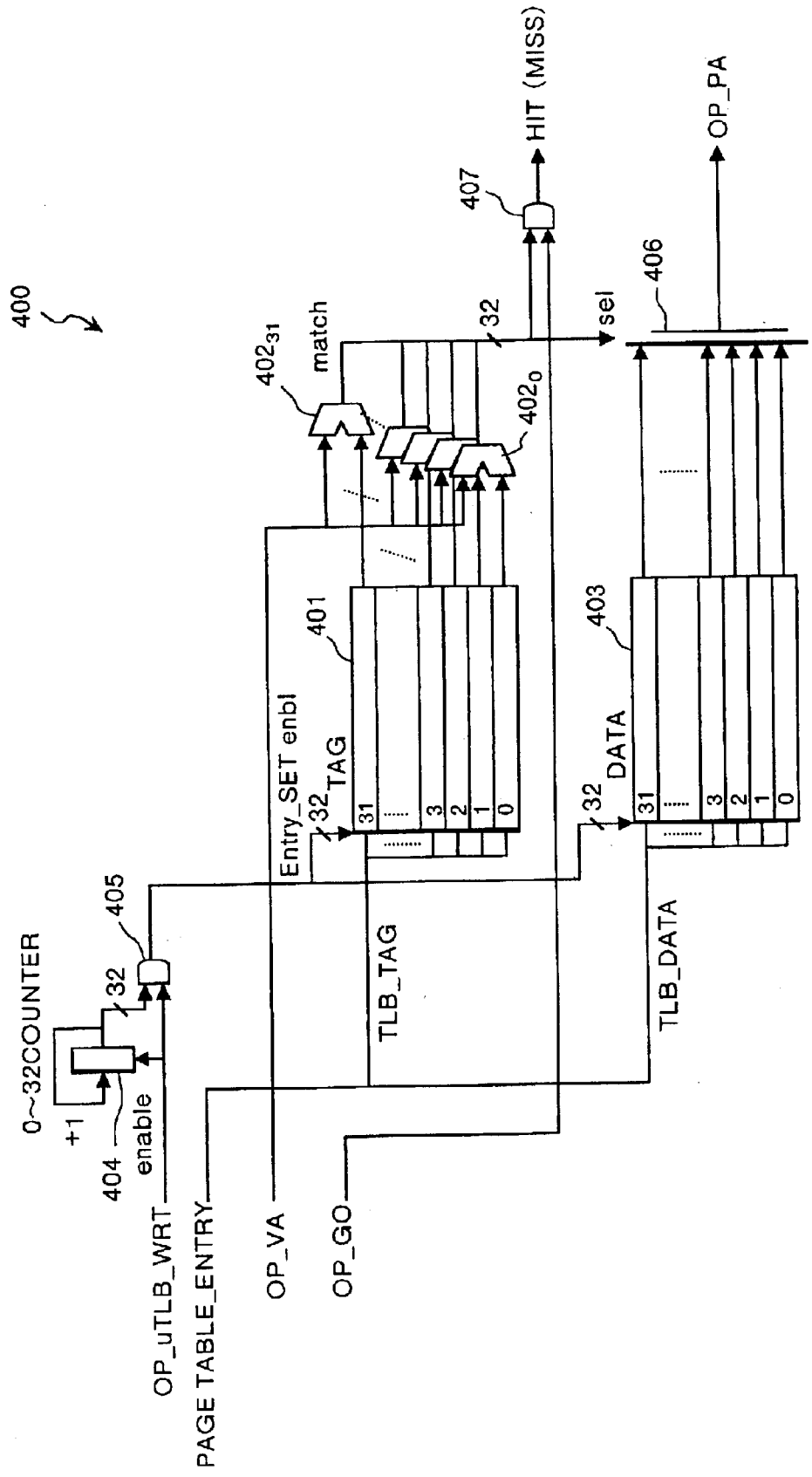
FIG. 8 is a block diagram that shows a structure of a higher OP address translator 400 shown in FIG. 7.

FIG. 8 is a block diagram that shows a structure of the higher OP address translator 400. A TLB tag 401 and a TLB data 403 constitute the operand TLB.

The TLB 400 has 32 (0 to 31) entries, and the TLB tag 401 stores TLB-TAG <41:0> (tag) (refer to FIG. 6) as a part of the operand TLB data. On the other hand, the TLB data 403 stores TLB-DATA <29:0> (refer to FIG. 6) as a part of the operand TLB data.

Comparator circuits $402_0$ to $402_{31}$, are provided corresponding to the entries of the TLB tag 401. Each comparator circuit compares TLB-TAG <41:0> stored in each entry with OP_VA <63:22> (operand virtual address). When both data coincide with each other, the comparator circuit outputs a match signal of 1 to obtain HIT (TLB hit) to an AND circuit 407.

The AND circuit 407 takes AND of OP_GO (operand access request signal) and the match signal, and sets HIT (TLB hit) at the time of the match signal of 1.

When HIT (TLB hit) has occurred, a comparator circuit that has obtained the coincidence among the comparator circuits $402_0$ to $402_{31}$ outputs a selection signal sel to a selecting OP-TLB. The selecting circuit 406 combines TLB-DATA <29:0> from the TLB data 403 with OP_VA (12:0>, and generates OP_PA <42:0> (operand physical address).

Referring back to FIG. 7, the higher IF address translator 500 has the same structure as that of the higher OP address translator 400, and stores a part of instruction TLB data out of the instruction TLB data stored in the TLB of the lower address translator 600, in the instruction TLB.

This higher IF address translator 500 can carry out the processing at a higher speed than the lower address translator 600. IF_VA (instruction virtual address) is an instruction virtual address corresponding to an instruction, and has the same data structure as that of the virtual address VA.

IF_GO (instruction access request signal) is a signal that shows that IF_VA (instruction virtual address) has been output, that is, the instruction access has been requested for.

When IF_GO (instruction access request signal) and IF_VA (instruction virtual address) have been input, the higher IF address translator 500 searches the instruction TLB. When the searching has HIT (TLB hit), the higher IF address translator 500 translates IF_VA (instruction virtual address) into IF_PA (instruction physical address) by using the instruction TLB.

When the searching has been MISS, the higher IF address translator 500 outputs IF_mTLB_GO (instruction access request signal) to make the lower address translator 600 carry out address translation.

A latch circuit 700 latches information of MISS in the higher OP address translator 400, and outputs this information as OP_mTLB_GO (operand access request signal), to the lower address translator 600. A latch circuit 701 latches OP_VA (operand virtual address).

A latch circuit 702 latches information of MISS in the higher IF address translator 500, and outputs this information as IF_mTLB_GO (instruction access request signal), to the lower address translator 600. A latch circuit 703 latches IF_VA (instruction virtual address).

When OP_mTLB_GO (operand access request signal) and OP_VA (operand virtual address) have been input, the lower address translator 600 searches the TLB.

OP_GO (operand access request signal) and OP_VA (operand virtual address) shown in FIG. 7 correspond to OP_GO (operand access request signal) and OP_ACS_ADD_VA (operand virtual address) shown in FIG. 1 respectively.

When it is possible to translate OP_VA (operand virtual address) into OP_PA (operand physical address), that is, when HIT (TLB hit) has occurred regarding the operand access, the lower address translator 600 outputs PAGE_TABLE_ENTRY (TLB data) and OP_uTLB_WRT (operand TLB data write signal) to the higher OP address translator 400.

Figures 9, 10:
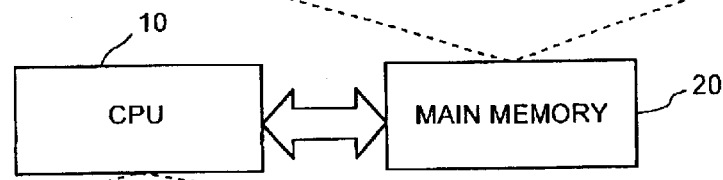
FIG. 9 is a diagram that shows a data structure of PAGE_TABLE_ENTRY shown in FIG. 7.
FIG. 10 is a block diagram that explains a conventional address translation.

PAGE_TABLE_ENTRY (TLB data) consists of TLB-TAG <41:0> and TLB-DATA <29:0> corresponding to HIT (TLB hit), as shown in FIG. 9.

OP_uTLB_WRT (operand TLB data write signal) is a signal to instruct that PAGE_TABLE_ENTRY (TLB data)

corresponding to the operand access should be written to the operand TLB (the TLB tag 401, the TLB data 403; refer to FIG. 8) of the higher OP address translator 400.

When OP_uTLB_WRT (operand TLB data write signal) has been input to an AND circuit 405 shown in FIG. 8, the AND circuit 405 takes AND of this signal and an output of an entry counter 404. The AND circuit 405 outputs Entry_SET enabl signal corresponding to the entry to the TLB tag 401 and the TLB data 403.

When the Entry_SET enabl signal has been input to the TLB tag 401, TLB-TAG <41:0> included in PAGE_TABLE_ENTRY (TLB data) is stored into the entry of the TLB tag 401. When Entry_SET enabl signal has been input to the TLB data 403, TLB-DATA <29:0> included in PAGE_TABLE_ENTRY (TLB data) is stored into the entry of the TLB data 403.

Referring back to FIG. 7, when it is possible to translator IF_VA (instruction virtual address) into IF_PA (instruction physical address), that is, when HIT (TLB hit) has occurred regarding the instruction access, the lower address translator 600 outputs PAGE_TABLE_ENTRY (TLB data) and IF_uTLB_WRT (instruction TLB data write signal) to the higher IF address translator 500.

IF_uTLB_WRT (instruction TLB data write signal) is a signal to instruct that PAGE_TABLE_ENTRY (TLB data) corresponding to the instruction access should be written to the instruction TLB (not shown) of the higher IF address translator 500.

Operand Access

The operation of the address translation apparatus according to the second embodiment will be explained. First, a case of only the operand access will be explained.

When OP_VA (operand virtual address) and OP_GO (operand access request signal) shown in FIG. 7 have been input to the higher OP address translator 400, the higher OP address translator 400 compares OP_VA <63:22> with TLB-TAG <41:0> stored in the operand TLB.

When both data coincide with each other, HIT (TLB hit) occurs. The higher OP address translator 400 combines OP_VA <12:0> with TLB-DATA <29:0> stored in the operand TLB, and outputs OP_PA <42:0> (operand physical address).

Based on the above OP_PA (operand physical address), data is read from or written to the main memory.

On the other hand, when OP_VA <63:22> does not coincide with TLB-TAG <41:0> as a result of the comparison in the higher OP address translator 400, MISS occurs. Then, the latch circuit 700 latches OP_mTLB_GO (operand access request signal), and the latch circuit 701 latches OP_VA (operand virtual address).

At the next timing, OP_mTLB_GO (operand access request signal) and OP_VA (operand virtual address) are input to the lower address translator 600. The lower address translator 600 searches TLB based on OP_VA (operand virtual address), in a similar manner to that of the address translation apparatus 100 (refer to FIG. 1).

When HIT (TLB hit) occurs regarding the operand access, the lower address translator 600 outputs PAGE_TABLE_ENTRY (TLB data) and OP_uTLB WRT (operand TLB data write signal) to the higher OP address translator 400.

The higher OP address translator 400 stores TLB-TAG <41:0> and TLB-DATA <29:0> into the operand TLB. At the next timing afterward, the higher OP address translator 400 translates OP_VA (operand virtual address) into OP_PA (operand physical address).

Instruction Access

A case of only the instruction access will be explained. When IF_VA (instruction virtual address) and IF_GO (instruction access request signal) shown in FIG. 7 have been input to the higher IF address translator 500, the higher IF address translator 500 compares IF_VA <63:22> with TLB-TAG <41:0> stored in the instruction TLB.

When both data coincide with each other, HIT (TLB hit) occurs. The higher IF address translator 500 combines IF_VA <12:0> with TLB-DATA <29:0> stored in the instruction TLB, and outputs IF_PA <42:0> (instruction physical address).

Based on the above IF_PA (instruction physical address), an instruction code is read from the main memory.

On the other hand, when IF_VA <63:22> does not coincide with TLB-TAG <41:0> as a result of the comparison in the higher IF address translator 500, MISS occurs. Then, the latch circuit 702 latches IF_mTLB_GO (instruction access request signal), and the latch circuit 703 latches IF_VA (instruction virtual address).

At the next timing, IF_mTLB_GO (instruction access request signal) and IF_VA (instruction virtual address) are input to the lower address translator 600. The lower address translator 600 searches TLB based on IF_VA (instruction virtual address), in a similar manner to that of the address translation apparatus 100 (refer to FIG. 1).

When HIT (TLB hit) occurs regarding the instruction access, the lower address translator 600 outputs PAGE_TABLE_ENTRY (TLB data) and IF_uTLB_WRT (instruction TLB data write signal) to the higher IF address translator 500.

The higher IF address translator 500 stores TLB-TAG <41:0> and TLB-DATA <29:0> into the instruction TLB. At the next timing onward, the higher IF address translator 500 translates IF_VA (instruction virtual address) into IF_PA (instruction physical address).

Access Collision

A case of a simultaneous occurrence of the operand access and the instruction access according to the pipeline control, that is, the occurrence of an access collision, will be explained.

OP_GO (operand access request signal) and OP_VA (operand virtual address) shown in FIG. 7 are input to the higher OP address translator 400, and IF_GO (instruction access request signal) and IF_VA (instruction virtual address) are input to the higher IF address translator 500, at the same time.

Both the higher OP address translator 400 and the higher IF address translator 500 operate independently. Therefore, when TLB hit occurs in both, it becomes possible to carry out address translation in parallel.

Thus, according to the second embodiment, address translation is carried out in a two-layer structure consisting of the higher OP address translator 400 and the higher IF address translator 500, and the lower address translator 600 that executes the operand access with priority and thereafter translates the wait instruction virtual address held in the wait register (not shown) into the physical address, when the access collision has occurred that the operand access and the instruction access are generated at the same time. Therefore, there occurs no time loss due to the retry, and it becomes possible to carry out the address translation at a high speed.

As explained above, according to the present invention, when the access collision has occurred that the operand access to the operand address translation buffer and the instruction access to the instruction address translation buffer are generated at the same time, the operand access is executed with priority. Thereafter, the held instruction virtual address is translated into the physical address. Therefore, there occurs no time loss due to the retry, and there is an effect that it becomes possible to carry out the address translation at a high speed.

Further, according to the present invention, there are provided the address translation buffers in which the operand address translation buffer and the instruction address translation buffer have fixed areas respectively, and share the same memory. As there is a limit in the fixed area, the capacity of one of the address translation buffers does not increase in excess of the capacity of the other address translation buffer. As the hit rate of address translation is stabilized, there is an effect that it becomes possible to stabilize the processing speed of address translation.

Further, according to the present invention, the operand access to the operand address translation buffer is controlled based on the operand selection flag and the address of the operand address translation data. Further, the instruction access to the instruction address translation buffer is controlled based on the instruction selection flag and the address of the instruction address translation data. Therefore, there is an effect that it is possible to efficiently carry out access to the operand address translation buffer and the instruction address translation buffer.

Further, according to the present invention, when the access collision has occurred that a new operand access and the instruction access corresponding to the held instruction virtual address are generated at the same time, the new operand access is executed with priority. Thereafter, the instruction access corresponding to the held instruction virtual address is executed. Therefore, there occurs no time loss due to the retry, and there is an effect that it becomes possible to carry out the address translation at a high speed.

Further, according to the present invention, when the access collision has occurred that a high-priority instruction access that is set with a high priority among a plurality of instruction accesses and an instruction access corresponding to the held instruction virtual address are generated at the same time, the high-priority instruction access is executed with priority. Thereafter, the instruction access corresponding to the held instruction virtual address is carried out. Therefore, there is an effect that it is possible to carry out the instruction access by interruption.

Further, according to the present invention, address translation is carried out in a two-layer structure consisting of the higher operand address translating unit and the higher instruction address translating unit, and the lower address translating unit that executes the operand access with priority and thereafter translates the held instruction virtual address into the physical address, when the access collision has occurred that the operand access to the operand address translation buffer and the instruction access to the instruction address translation buffer are generated at the same time. Therefore, there occurs no time loss due to the retry, and there is an effect that it becomes possible to carry out the address translation at a high speed.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An address translation apparatus comprising:
    an address translation buffer including an operand address translation buffer, which stores operand address translation data for translation of an operand virtual address into a physical address, and an instruction address translation buffer, which stores instruction address translation data for translation of an instruction virtual address into a physical address, the operand address translation buffer and the instruction address translation buffer having a fixed area and sharing the same memory;
    an operand access control unit that carries out control to execute an operand access with priority, and to hold an instruction virtual address corresponding to an instruction access, when an access collision has occurred that the operand access to the operand address translation buffer and the instruction access to the instruction address translation buffer are generated at the same time; and
    an instruction access control unit that carries out control to execute an instruction access after finishing the operand access, and to translate the instruction virtual address held into a physical address based on data stored in the instruction address translation buffer.

2. The address translation apparatus according to claim 1, wherein
    the operand access control unit controls the operand access to the operand address translation buffer, based on an operand selection flag that is issued according to an operand access request and is used to select the operand address translation buffer side, and an address of the operand address translation data that is included in the operand virtual address and is in the operand address translation buffer, and the instruction access control unit controls the instruction access to the instruction address translation buffer, based on an instruction selection flag that is issued according to an instruction access request and is used to select the instruction address translation buffer side, and an address of the instruction address translation data that is included in the instruction virtual address and is in the instruction address translation buffer.

3. The address translation apparatus according to claim 1, wherein
    when an access collision has occurred that a new operand access and an instruction access corresponding to the held instruction virtual address are generated at the same time, the operand access control unit carries out control to execute the new operand access with priority, and the instruction access control unit carries out control to execute the instruction access corresponding to the held instruction virtual address after finishing the new operand access.

4. The address translation apparatus according to claim 1, wherein
    when an access collision has occurred that a high-priority instruction access that is set with a high priority among a plurality of instruction accesses and an instruction access corresponding to the held instruction virtual address are generated at the same time, the instruction access control unit carries out control to execute the high-priority instruction access with priority, and thereafter execute the instruction access corresponding to the held instruction virtual address.

5. The address translation apparatus according to claim 1, wherein
    when an access collision has occurred that a high-priority instruction access that is set with a high priority among a plurality of instruction accesses and an operand access are generated at the same time, the operand access control unit carries out control to execute the operand access with priority, and the instruction access control unit carries out control to abandon the held instruction virtual address, hold the instruction virtual address corresponding to the high-priority instruction access, and execute the high-priority instruction access corresponding to the held instruction virtual address after finishing the operand access.

6. The address translation apparatus according to claim 1, wherein
when there is a new instruction access request in a state that the instruction virtual address corresponding to the instruction access is being held, the instruction access control unit carries out control to execute the instruction access corresponding to the held instruction virtual address with priority, hold the instruction virtual address corresponding to the new instruction access, and execute the instruction access corresponding to the held instruction virtual address after finishing the former instruction access.

7. An address translation method that uses an address translation buffer including an operand address translation buffer, which stores operand address translation data for translation of an operand virtual address into a physical address, and an instruction address translation buffer, which stores instruction address translation data for translation of an instruction virtual address into a physical address, the operand address translation buffer and the instruction address translation buffer having a fixed area and sharing the same memory, the address translation method comprising:
an operand access control step of carrying out control to execute an operand access with priority, and to hold an instruction virtual address corresponding to an instruction access, when an access collision has occurred that the operand access to the operand address translation buffer and the instruction access to the instruction address translation buffer are generated at the same time; and
an instruction access control step of carrying out control to execute an instruction access after finishing the operand access, and to translate the held instruction virtual address into a physical address by using the instruction address translation buffer.

8. The address translation method according to claim 7, wherein
the operand access control step is for controlling the operand access to the operand address translation buffer, based on an operand selection flag that is issued according to an operand access request and is used to select the operand address translation buffer side, and an address of the operand address translation data that is included in the operand virtual address and is in the operand address translation buffer, and the instruction access control step is for controlling the instruction access to the instruction address translation buffer, based on an instruction selection flag that is issued according to an instruction access request and is used to select the instruction address translation buffer side, and an address of the instruction address translation data that is included in the instruction virtual address and is in the instruction address translation buffer.

9. The address translation method according to claim 7, wherein
when an access collision has occurred that a new operand access and an instruction access corresponding to the held instruction virtual address are generated at the same time, at the operand access control step, control to execute the new operand access with priority is carried out, and at the instruction access control step, control to execute the instruction access corresponding to the held instruction virtual address after finishing the new operand access is carried out.

10. The address translation method according to claim 7, wherein
when an access collision has occurred that a high-priority instruction access that is set with a high priority among a plurality of instruction accesses and an instruction access corresponding to the held instruction virtual address are generated at the same time, at the instruction access control step, control to execute the high-priority instruction access with priority, and thereafter execute the instruction access corresponding to the held instruction virtual address is carried out.

11. A two-layer address translation apparatus comprising:
a lower address translating unit having
an address translation buffer including an operand address translation buffer, which stores operand address translation data for translation of an operand virtual address into a physical address, and an instruction address translation buffer, which stores instruction address translation data for translation of an instruction virtual address into a physical address, the operand address translation buffer and the instruction address translation buffer having a fixed area and sharing the same memory;
an operand access control unit that carries out control to execute an operand access with priority, and hold an instruction virtual address corresponding to an instruction access, when an access collision has occurred that the operand access to the operand address translation buffer and the instruction access to the instruction address translation buffer are generated at the same time; and
an instruction access control unit that carries out control to execute an instruction access after finishing the operand access, and translating the held instruction virtual address into a physical address by using the instruction address translation buffer;
a higher operand address translating unit that can be accessed at a higher speed than the operand address translation buffer, and that holds a part of operand address translation data stored in the operand address translation buffer, translates the operand virtual address into the physical address according to the operand access, and requests the lower address translating unit to carry out the translation when it is not possible to carry out the translation; and
a higher instruction address translating unit that can be accessed at a higher speed than the instruction address translation buffer, and that holds a part of instruction address translation data stored in the instruction address translation buffer, translates the instruction virtual address into the physical address according to the instruction access, and requests the lower address translating unit to carry out the translation when it is not possible to carry out the translation.

12. The two-layer address translation apparatus according to claim 11, wherein
the operand access control unit controls the operand access to the operand address translation buffer, based on an operand selection flag that is issued according to an operand access request and is used to select the operand address translation buffer side, and an address of the operand address translation data that is included in the operand virtual address and is in the operand address translation buffer, and the instruction access control unit controls the instruction access to the instruction address translation buffer, based on an instruction selection flag that is issued according to an instruction access request and is used to select the instruction address translation buffer side, and an address of the instruction address translation data that is included in the instruction virtual address and is in the instruction address translation buffer.

13. The two-layer address translation apparatus according to claim 11, wherein when an access collision has occurred that a new operand access and an instruction access corresponding to the held instruction virtual address are generated at the same time, the operand access control unit carries out control to execute the new operand access with priority, and the instruction access control unit carries out control to execute the instruction access corresponding to the held instruction virtual address after finishing the new operand access.

14. The two-layer address translation apparatus according to claim 11, wherein when an access collision has occurred that a high-priority instruction access that is set with a high priority among a plurality of instruction accesses and an instruction access corresponding to the held instruction virtual address are generated at the same time, the two-layer address translation apparatus carries out control to execute the high-priority instruction access with priority, and thereafter execute the instruction access corresponding to the held instruction virtual address.

* * * * *